Sept. 9, 1941.  F. J. LAPOINTE  2,255,221
METHOD OF AND MEANS FOR SURFACE BROACHING
Filed Sept. 2, 1937  3 Sheets-Sheet 2
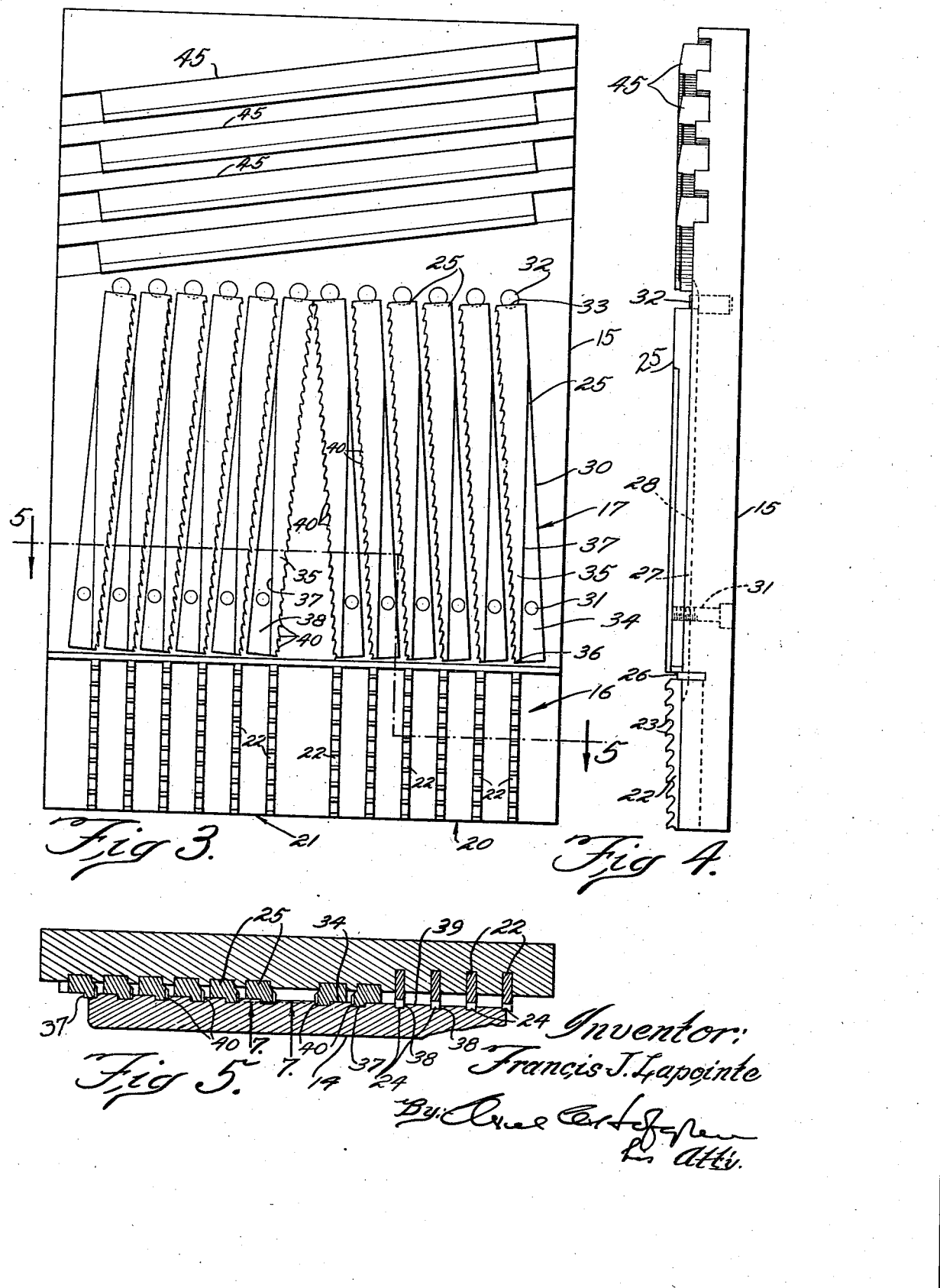

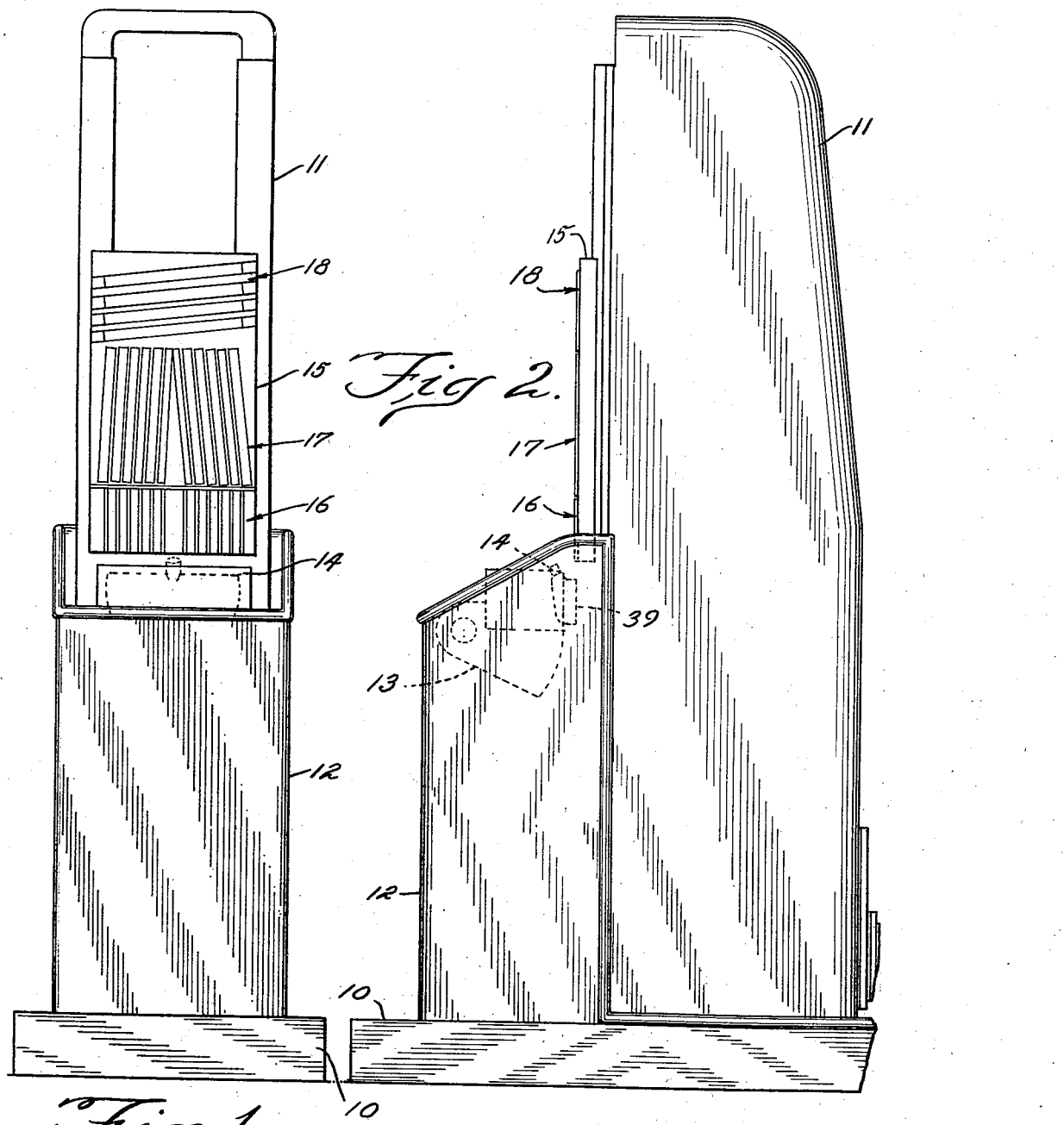

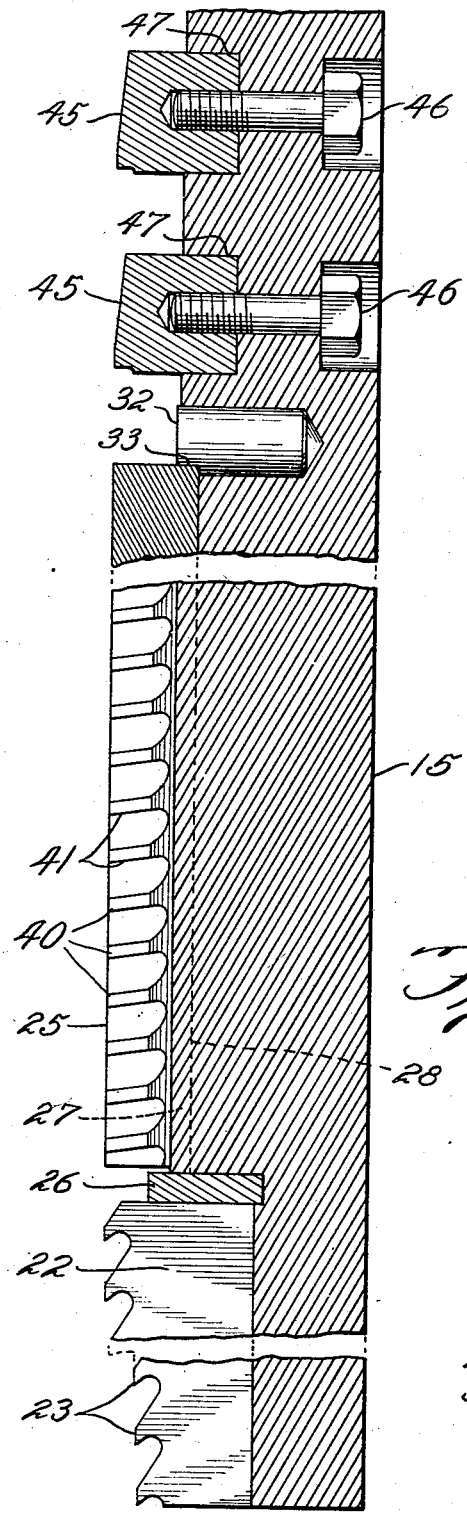
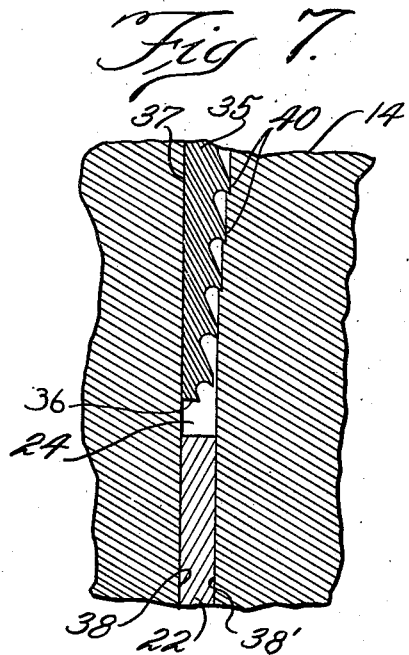
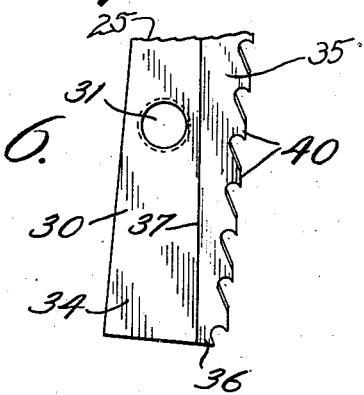
Fig. 7.
Fig. 8.
Fig. 6.
Inventor:
Francis J. Lapointe Patented Sept. 9, 1941

2,255,221

UNITED STATES PATENT OFFICE 2,255,221

METHOD OF AND MEANS FOR SURFACE BROACHING

Francis J. Lapointe, Ann Arbor, Mich., assignor, by mesne assignments, to American Broach & Machine Co., Ann Arbor, Mich., a corporation of Michigan Application September 2, 1937, Serial No. 162,178

13 Claims. (Cl. 90—33)

The invention relates to a method of and means for removing material, particularly adapted to surface broaching.

One object of my invention is the provision of a new and improved method for removing material from the surface of a work piece by operation of a succession of broaching cuts, made in different directions with respect to the surface.

Another object is the provision of a new and improved method for broaching the surface of a work piece which employs first a series of spaced cuts made in the surface of the work piece and next a series of cuts resulting in the removal of surface material remaining between the first cuts.

Still another object is the provision of a new and improved method of and means for surface broaching which employs broaches in a novel grouping, one group for making a series of spaced cuts in the surface of the work piece, another group of broaches for cutting away the material between the series of cuts and still another group for making a finishing cut across the broached surface of the work piece.

A further object is the provision of a new and improved surface broach adapted to be inserted in a slot made in the surface of a work piece and forced through a broaching stroke during which it operates to cut away material from one side of the slot while being braced against the opposite wall of the slot.

Still a further object is the provision of a novel surface broach having teeth positioned to cut in a direction parallel to the surface to be broached and having the teeth so constructed that chips are tossed laterally of the broach itself and away from the surface which is being broached.

A still further object is the provision of a plurality of surface broaches for making cuts in a direction parallel to the face of the work piece, the plurality of broaches being divided into two groups, with each group inclined as a unit in opposite directions so that during the cut the force exerted by one group upon the work piece is counterbalanced by the force exerted on the work piece by the other group.

An additional object is the provision of a new and improved broaching device for removing material from the surface of a work piece by the action of a succession of broaches adapted to make cuts in different directions with respect to the surface.

Another object is the provision of a new and improved broaching device for removing material from the surface of a work piece which employs a series of broaches for making spaced cuts in the surface of the work piece, and next another series of broaches cutting in a different direction for removing the surface material remaining between the first cuts.

Another object is the provision of a new and improved surface broaching device which employs a group of broaches for making a series of spaced cuts in the surface of a work piece, then employs another group of broaches for cutting away the material between the series of cuts originally made, and finally employs still a third group of broaches for making a finished cut across the surface broached by the combined action of the first two groups of broaches.

Other objects and advantages of my invention will appear as the description proceeds taken in connection with the drawings which form a part of this specification.

In the drawings:

Fig. 1 is a front elevation of the broaching device mounted on a vertical broaching machine;

Fig. 2 is a side elevation of the machine shown in Fig. 1;

Fig. 3 is a front elevation of the broaching device shown detached from the machine;

Fig. 4 is a side elevation of the device shown in Fig. 3;

Fig. 5 is a sectional view taken on the line 5—5 at Fig. 3 looking in the direction of the arrows with the addition of a work piece shown in section;

Fig. 6 is an enlarged side view of the device shown in section;

Fig. 7 is an enlarged sectional view taken on line 7—7 of Fig. 5 looking in the direction of the arrows; and Fig. 8 is a fragmental elevation of the lower end of one of the central broaches.

While I have shown in the drawings and will herein describe in detail the preferred embodiment of my invention, it is to be understood that I do not thereby intend to limit the invention to the specific form disclosed, but aim to cover all modifications and alternative constructions falling within the spirit and scope of the invention as expressed in the appended claims.

While surface broaching has frequently been resorted to for removing material from the surface of a work piece, it has always been found in practice, that material could be removed only to a limited extent, because of the considerable force required in broaching operations. Difficulties have been encountered when it has been desired to broach a very large expanse of surface at a single broaching stroke and also when it is desired to broach into the surface of a work piece to any great depth. Since only a cut of limited depth can be made by each tooth, which in the case of a wide surface is very slight, a broach of prohibitive length would be required to broach a cut of the depth needed or else a stroke for the machine too long to be practicable.

The present invention contemplates a novel single stroke broaching method which is operative, by reason of making cuts of different character into the surface of the work piece, to remove material from a considerable expanse of surface and to an appreciable depth.

In the preferred form described, this broaching method contemplates the cutting away of the surface of a work piece in different directions by the use of a series of groups of broaches, all mounted upon a single support so that the operation can be performed by a single stroke. A device for performing the method is shown in the drawings mounted upon a vertical broaching machine provided with a bracket at the front upon which a work piece may be secured preparatory to a broaching operation. The first series of narrow spaced cuts is made by a lower group of surface broaches cutting into the surface of the work piece in a direction at right angles to the surface. Material between the first cuts is removed by using a plurality of broaches having teeth on the lateral edges. These broaches are inserted individually, one in each slot and as the movement of the support continues in a downward direction, this second series of broaches proceeds by action of the lateral teeth to cut away said material remaining between each of the slots first made in the work piece. After the entire surface has been cut away, a finishing cut is performed by a third set of broaches particularly designed as finishing broaches which are passed over the newly broached surface of the work piece during a continuation of the stroke in order to leave the surface of the work piece in a finished condition.

A means for performing the method is shown in the drawings, consisting of a base 10 which supports a column or frame 11 for enclosing and supporting the operating parts of the machine. At the front of the frame 11 is a bracket 12 to which is attached a tiltable work support 13 shown in dotted position in Figs. 1 and 2, and upon the work support there is shown mounted a work piece 14 positioned in the machine ready for a surface broaching operation. Mounted at the front of the machine is a backing 15 upon which is attached a series of broaches. This series comprises, in this embodiment of my invention, a lower set of broaches generally designated 16, an intermediate set of broaches generally designated 17 and an upper set of broaches generally designated 18, all arranged to be moved as a unit through a single broaching stroke. A suitable power mechanism, not shown, is used for reciprocating the series of broaches in a vertical direction, so that there is a cutting stroke in the downward direction and a return stroke in the upward direction.

The lower set of broaches 16 comprises a plurality of vertical broaches arranged in two groups 20 and 21 on either side of the center line through the device consisting of individual broaches 22. These broaches are mounted upon the lower portion of the backing 15 in suitable slots and abut a brace 26 at the top, with teeth 23 directed outward from the backing. The lower broaches positioned in this manner are adapted to cut a series of spaced slots or incisions 24 to a desired depth in the surface of the work piece 14 at right angles to the plane of the surface.

The second set of broaches 17 is positioned immediately above the lower set and consists of broaches separated into two groups corresponding to the grouping of the lower set of broaches, each containing a plurality of individual broaches 25 in sufficient number so that there is one broach 25 for each of the broaches in the lower set.

The two groups of broaches comprising the second set 17 are tilted towards each other at the tops, the angle of tilt being such that, taken with the length of the broach, the top of each broach occupies a position overlapping the slot adjacent. By this arrangement, it is made certain that all of the material remaining between the initially formed slots 24 is completely removed by action of lateral teeth formed on the second set of broaches.

In order that the broaching device may operate in the manner intended, the broaches 25 of the second set are constructed in a particular manner. Each of the broaches 25 has an elongated body portion 30 of substantially constant width provided with a projection 27 at the base receivable in a corresponding slot 28 in the backing to which it is secured at the lower end by screws 31, and at the upper end by abutting pins 32, the abutting pins being provided each with a flat milled face 33, in order to bear evenly upon the upper end of the broaches 25.

It will be seen that each broach 25 has extending outward from the front face thereof a wedge shaped portion 35. The lowermost end or apex 36 of the wedge shaped portion is narrower in width than the corresponding width of each lower broach 22 as indicated in Fig. 7, so that the apex 36 may fit readily within the slot or cut broached by the corresponding lower broach 22. In addition, one side 37 of the wedge shaped portion is straight and extends in line with the direction of the stroke of the broaching device. The edge 37 is also flat as shown in Fig. 5 and when inserted in its corresponding slot 24 acts as a brace for the broach by bearing directly against a side 38 of the slot. It will be seen also, by reference to Fig. 5, that the outward extending wedge shaped portion of the broaches 25 has such a thickness, that it enters completely into the slots 24 and is limited under ordinary circumstances to a depth flush with the bottom of the slot by reason of a laterally extending portion 34 of the broach becoming flush with the outer surface 39 of the portion of the work piece 14 which is being broached. Should the depth of the slot 24 result less than the thickness of the protruding wedge shaped portion 35, the broach is prevented from cutting deeper than the depth of the slot by contact of the outer face of the wedge shaped portion 35 with the bottom.

The other edge of the wedge shaped portion of the broach 25, opposite from the flat edge 37, has a series of broaching teeth 40 cut therein and so arranged that a line drawn through the cutting edges of the teeth is inclined from the perpendicular at such an angle that when the last tooth has passed the surface of the work piece, it is in a position overlapping the slot 24 adjacent the slot in which the broach 25 was originally inserted.

In operation, each of the broaches 25 included in the second set of broaches 17 enters the slot cut by its corresponding broach 22 of the first set 16, so that the apex 36 of the second set of broaches lies completely within the slot 24. As the broaching device is forced downward through its broaching stroke, the flat side 37 of the wedge shaped portion 35 of the broach is braced against one side 38 of its corresponding slot 24 and forces the opposite toothed edge of the wedge shaped portion against the opposite side 38' of the cut 24 to assure a positive broaching stroke for clearing away all of the material between the slots.

It is significant that the teeth 40 of the broaches 35 have the cutting edges and a portion of the undercut of each pitched sidewise at 41 in an inclined direction with respect to the broach itself, as best seen in Fig. 6. By constructing the teeth in this manner, chips of metal cut from the surface of the work piece are tossed in a lateral direction with respect to the broach and outward from the face of the work piece in such a manner that they will not clog the teeth of the broaches during the cutting stroke. This is important in view of the fact that such a large quantity of material is cut from the surface of the work piece at one time.

Furthermore, because so much force is exerted against the work piece in removing therefrom a large quantity of the material by action of the broach teeth all biting in the same direction, the second set of broaches is arranged in two balanced groups tilted in opposite directions. By such an arrangement, the force exerted by the cutting action of the teeth of one of the groups of broaches, which would ordinarily tend to shift the work piece laterally in the machine, is counterbalanced by the force exerted by the cutting action of the teeth in the group of broaches at the opposite side. It will, therefore, be apparent that the thrust exerted by the cutting action of all of the broaches is actually made use of in securing the work piece positively in alignment during the cutting stroke and is at the same time instrumental in balancing the strain on the backing for the broaches.

After the bulk of material has been removed from the surface of the work piece, the third or finishing set of broaches 18 is passed through a broaching stroke. This finishing set is comprised of individual broaches 45 which are secured in slots 47 of the backing 15 by means of screws 46. The broaches extend completely across the face of the support 15 and are inclined slightly from the horizontal so that a slicing cut is made during the finish stroke. By reason of the fact that these last broaches 45 extend the entire distance from one side of the device to the other, a smooth level cut is made in the work piece deep enough only to remove any roughness in the surface with the result that a perfectly plane finished surface is produced on the work piece 14.

In the structure described, there has thus been disclosed a broaching tool or device comprising a plurality of parts arranged in a particular manner to make possible the broaching of large areas of the surface of a work piece at an appreciable depth in such a manner that the operation can be completely finished in a single working stroke of the broaching machine.

I claim as my invention:

1. The method of removing surface material from a work piece to a desired depth comprising placing the work piece in a fixed position, broaching a plurality of spaced slots in the surface thereof with one set of broaches, placing individual broaches comprising another set one in each of said slots, bracing the broach in each slot against a side of the slot and then moving the said second set of broaches through a cutting stroke so as to remove all the material between the opposite side of the slot and the next adjacent slot.

2. A multiple broaching tool for cutting away a portion of the surface of a work piece comprising a support or backing for the tool, means forming a first set of broaches for broaching a series of spaced cuts into the surface of the work piece, means forming a second set of broaches comprising individual members having portions adapted to engage the spaced cuts, said portions having lateral cutting edges tilted slightly from the vertical for broaching away the surface portions intermediate the first cuts.

3. A multiple broaching tool for cutting away a portion of the surface of a work piece comprising a support or backing for the tool, means forming a first set of vertical broaches for broaching a series of spaced cuts into the surface of the work piece, means forming a second set of broaches comprising individual members having cutting portions adapted to engage the spaced cuts, said portions having lateral cutting edges tilted slightly from the vertical, said individual members being balanced in two groups with their respective cutting edges positioned in opposite directions for broaching a series of cuts intermediate the first series of cuts.

4. A compound broaching tool for operating on the surface of a work piece comprising a first cutting means for cutting the sides and bottom of a slot in the surface of the work piece, a second cutting means including a wedge shaped portion receivable into the slot having one edge flat and continuous and operable as a brace against one side of the slot, and the other edge supplied with teeth for cutting away the other side of the slot.

5. A compound broaching tool for operating on the surface of a work piece comprising a first broaching means for cutting out the sides and bottom of an initial slot in the surface of the work piece, a second broaching means for making a cut at an angle to the cut made by the first means including a wedge shaped portion having one edge extending vertically in the same general direction as the first broaching means operable as a brace against one side of the slot, and the other edge supplied with teeth disposed on a line at an angle with the first edge for broaching away the other side of the slot, the apex of said wedge shaped portion being of a width narrower than the first broaching means to permit it to completely enter the initial slot.

6. A broaching tool for removing material from the surface of a work piece comprising a body adapted to be secured to a support, and an elongated portion having a narrow end, said portion having an edge provided with broaching teeth extending laterally therefrom, said teeth having a portion at the undercut thereof pitched sidewards at an angle so as to throw chips laterally of the broaching tool away from the surface of the work piece.

7. A broaching tool for removing material from the surface of a work piece comprising a bed like support having a recess therein, a body having a base portion at one side adapted to be secured to the support within the recess and having a protruding wedge shaped portion at another side, said wedge shaped portion having an edge provided with broaching teeth extending laterally therefrom, said teeth having a portion at the undercut pitched sidewards at an angle so as to 8. A device for removing material from the slotted surface of a work piece comprising a broaching tool having a body including a longitudinally disposed wedge shaped portion thereon and a laterally extending shoulder on the body set back from the face of the wedge shaped portion, the apex of said wedge shaped portion being sufficiently narrow to permit entrance into a slot in the work piece, said entrance being limited to a depth determined by contact of the laterally extending shoulder with the work piece, said wedge shaped portion having laterally extending teeth formed in an edge thereof operable to cut across the surface of the work piece.

9. A device for removing material from the surface of a work piece provided with a vertical slot comprising a broaching tool having a body of uniform maximum thickness including a longitudinally disposed wedge shaped portion on the outward face of the body and a laterally extending part of said body depressed below the face of the wedge shaped portion, the apex of said wedge shaped portion being sufficiently narrow to permit entrance thereof into the vertical slot of the body, said entrance being limited to a depth determined by contact of the laterally extending part of the body with the surface of the work piece, said wedge shaped portion having teeth formed in an edge thereof and extending laterally therefrom to cut material from the work piece in a direction parallel to the surface thereof.

10. A multiple single stroke broaching tool for cutting away a portion of the surface of a work piece comprising a support or backing for the tool having groups of recesses formed therein, means forming a first set of vertical broaches having projections thereon engaging one of said groups of recesses for broaching a series of spaced cuts into the surface of the work piece, and means forming a second set of broaches having projections thereon for engaging another of said groups of recesses comprising individual members each provided with a lateral cutting edge tilted slightly from a vertical position bearing broaching teeth adapted to engage the spaced cuts, said teeth having a portion at the undercut pitched sidewards at an angle so as to throw chips laterally of the teeth away from the surface of the work piece, the individual members of the second set of broaches being balanced in two groups with their respective cutting edges positioned in opposite directions for broaching a series of cuts intermediate the first series of cuts.

11. A compound single stroke broaching tool for broaching and finishing the surface of a work piece comprising a backing for the tool, a first series of surface broaches attachable to the backing for cutting out the sides and bottom of a series of initial slots in the surface of a work piece, a second series of broaches attachable to the backing for making cuts at right angles to the cuts made by the first series of broaches comprising a plurality of individual broaches, one insertable in each of said initial slots, each broach including a wedge shaped portion having one edge extending vertically in the same general direction as the sides of the initial slot operable as a brace against one of said sides, and another edge supplied with teeth disposed on a line at an angle with the first edge for broaching away the other side of the slot, and a laterally extending shoulder portion adjacent one of the edges set back from the face of the broach, the apex of each of said wedge shaped portions being sufficiently narrow to permit admission into its respective initial slot, said admission being limited to a depth determined by contact of the laterally extending shoulder portion with the normal surface of the work piece, and another group of finishing broaches attachable to the backing for finishing the portion of the surface of the work piece jointly broached by the preceding two series of broaches.

12. A tool for surface broaching comprising a support, a first broaching means composed of a plurality of individual laterally spaced and parallel broaching elements operable to cut a plurality of incisions into the surface of the work piece, and a second broaching means composed of a plurality of broaching elements one for each of the broaching elements in said first broaching means, each of the elements of said second broaching means being operable to engage a side wall of the incision formed by the corresponding element of the first broaching means to broach across the work piece at the depth of the incision in the work piece, the trailing portion of each of said elements of said second broaching means extending laterally beyond the adjacent side wall of the adjacent incision so as to be operable to remove all of the material between the adjacent incisions.

13. A tool for surface broaching comprising a support, a first broaching means composed of a plurality of individual parallel and laterally spaced broaching elements each having progressively extending teeth operable to form a narrow slot in the surface of a work piece during longitudinal movement of the tool, and a second broaching means composed of a plurality of elongated, generally longitudinally disposed and parallel broaching elements, one for each of the elements in said first means, each of the broaching elements of said second means having a plurality of teeth formed on a face disposed at right angles to the toothed face of the elements of said first broaching means, said teeth projecting laterally progressively away from said first broaching means with the adjacent tooth receivable within the slot formed by the corresponding element of the first means and the remote tooth extending laterally beyond the opposed face of the adjacent element of said first means.

FRANCIS J. LAPOINTE.